(12) United States Patent
Ishida

(10) Patent No.: US 12,117,195 B2
(45) Date of Patent: Oct. 15, 2024

(54) CONTROL METHOD, COMPUTER-READABLE RECORDING MEDIUM STORING CONTROL PROGRAM, AND AIR CONDITIONING CONTROL DEVICE

(71) Applicant: FUJITSU GENERAL LIMITED, Kawasaki (JP)

(72) Inventor: Tsutomu Ishida, Kawasaki (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 345 days.

(21) Appl. No.: 17/667,008

(22) Filed: Feb. 8, 2022

(65) Prior Publication Data

US 2022/0154961 A1    May 19, 2022

Related U.S. Application Data

(63) Continuation of application No. PCT/JP2019/033811, filed on Aug. 28, 2019.

(51) Int. Cl.
| | | |
|---|---|---|
| *F24F 11/63* | (2018.01) | |
| *G05B 13/02* | (2006.01) | |
| *G05B 13/04* | (2006.01) | |

(52) U.S. Cl.
CPC ............ *F24F 11/63* (2018.01); *G05B 13/027* (2013.01); *G05B 13/041* (2013.01)

(58) Field of Classification Search
CPC .... F24F 11/63; F24F 2110/10; F24F 2120/10; F24F 11/64; F24F 11/79; G05B 13/027;
(Continued)

(56) References Cited

U.S. PATENT DOCUMENTS

2012/0174608 A1   7/2012 Kumamoto et al.
2016/0018124 A1   1/2016 Yamamoto et al.
(Continued)

FOREIGN PATENT DOCUMENTS

EP   3534083 A1   9/2019
JP   2010025432 A * 2/2010
(Continued)

OTHER PUBLICATIONS

International Search Report and Written Opinion of the International Searching Authority (Form PCT/ISA/210, 220, and 237), mailed in connection with PCT/JP2019/033811 and mailed Nov. 5, 2019 (Total 10 pages).

(Continued)

*Primary Examiner* — Charles Cai
(74) *Attorney, Agent, or Firm* — GREENBLUM & BERNSTEIN, P.L.C.

(57) ABSTRACT

A control method for causing a computer to perform a process includes: obtaining a trained model for each area of a plurality of areas; detecting a first radiation temperature for each of the areas; blowing blowout air to an area where temperature unevenness is predicted among the plurality of areas on a basis of the detected first radiation temperature for each of the areas and the trained model; detecting a second radiation temperature for the area after the blowout air is blown; and executing re-training of the trained model on a basis of a label related to temperature unevenness created on a basis of the second radiation temperature and the second radiation temperature.

12 Claims, 17 Drawing Sheets

(58) Field of Classification Search
CPC .................. G05B 13/041; G05B 15/02; G05B 2219/2614
See application file for complete search history.

(56) References Cited

U.S. PATENT DOCUMENTS

2016/0201933 A1* 7/2016 Hester ...................... F24F 11/48
  700/276
2022/0170659 A1* 6/2022 Kitagawa ............. G05B 19/042

FOREIGN PATENT DOCUMENTS

| JP | 2011-196666 A | 10/2011 |
| JP | 2011196666 | * 10/2011 |
| JP | 2016-522940 A | 8/2016 |
| JP | 2018-071885 A | 5/2018 |
| JP | 2019-015486 A | 1/2019 |
| WO | 2014/174871 A1 | 10/2014 |
| WO | 2014/182934 A1 | 11/2014 |

OTHER PUBLICATIONS

Japanese Office Action of Japanese mailed Feb. 7, 2023 for corresponding Japanese Patent Application No. 2021-541886, with English Translation, 6 pages.

* cited by examiner

FIG. 5

| EDGE A | TIME | ROOM TEMPERATURE | OUTSIDE TEMPERATURE | ... | RADIATION TEMPERATURE IN AREA L | RADIATION TEMPERATURE IN AREA C | RADIATION TEMPERATURE IN AREA R |
|---|---|---|---|---|---|---|---|
| | t0 | 18 | 10 | ... | 12 | 14 | 15 |
| | t1 | 20 | 11 | ... | 15 | 15 | 14 |
| | t2 | 21 | 12 | ... | 16 | 16 | 13 |
| | ... | ... | ... | ... | ... | ... | ... |
| | | 19 | 11 | ... | 15 | 15 | 14 |
| ... | ... | ... | ... | ... | ... | ... | ... |

FIG. 6

| EDGE A | TIME | ROOM TEMPERATURE | OUTSIDE TEMPERATURE | ... | RADIATION TEMPERATURE IN AREA L | RADIATION TEMPERATURE IN AREA C | RADIATION TEMPERATURE IN AREA R |
|---|---|---|---|---|---|---|---|
| | t0 | 18 | 10 | ... | ⟨12⟩ | 14 | 15 |
| | t1 | 20 | 11 | ... | 15 | 15 | 14 |
| | t2 | 21 | 12 | ... | 16 | 16 | ⟨13⟩ |
| | ... | ... | ... | ... | ... | ... | ... |
| | | 19 | 11 | ... | 15 | 15 | 14 |
| | ... | ... | ... | ... | ... | ... | ... |
| ... | | | | | | | |

↑ TEMPERATURE UNEVENNESS HAS OCCURRED IN AREA L
↑ NO TEMPERATURE UNEVENNESS HAS OCCURRED
↑ TEMPERATURE UNEVENNESS HAS OCCURRED IN AREA R

FIG. 7

LEARNING DATA FOR AREA L

| FEATURE VECTOR | | | | | | LABEL |
|---|---|---|---|---|---|---|
| ROOM TEMPERATURE | OUTSIDE TEMPERATURE | RADIATION TEMPERATURE IN AREA L | RADIATION TEMPERATURE IN AREA C | RADIATION TEMPERATURE IN AREA R | ... | |
| 18 | 10 | 12 | 14 | 15 | ... | 1 (WITH TEMPERATURE UNEVENNESS) |
| 20 | 11 | 15 | 15 | 14 | ... | 0 (NO TEMPERATURE UNEVENNESS) |
| 21 | 12 | 16 | 16 | 13 | ... | 0 |
| ... | ... | ... | ... | ... | ... | ... |
| 19 | 11 | 15 | 15 | 14 | ... | 0 |

⬇ NORMALIZATION

| FEATURE VECTOR | | | | | | LABEL |
|---|---|---|---|---|---|---|
| ROOM TEMPERATURE | OUTSIDE TEMPERATURE | RADIATION TEMPERATURE IN AREA L | RADIATION TEMPERATURE IN AREA C | RADIATION TEMPERATURE IN AREA R | ... | |
| -0.5 | -0.77 | -1.14 | -0.23 | 0.23 | ... | 1 (WITH TEMPERATURE UNEVENNESS) |
| 0.5 | 0.00 | 0.23 | 0.23 | -0.23 | ... | 0 (NO TEMPERATURE UNEVENNESS) |
| 1 | 0.77 | 0.68 | 0.68 | -0.68 | ... | 0 |
| ... | ... | ... | ... | ... | ... | ... |
| 0 | 0.00 | 0.23 | 0.23 | -0.23 | ... | 0 |

FIG. 8

LEARNING DATA FOR AREA R

| ROOM TEMPERATURE | OUTSIDE TEMPERATURE | FEATURE VECTOR ||||| LABEL |
|---|---|---|---|---|---|---|
| | | RADIATION TEMPERATURE IN AREA L | ... | RADIATION TEMPERATURE IN AREA C | RADIATION TEMPERATURE IN AREA R | |
| 18 | 10 | 12 | ... | 14 | 15 | 0 |
| 20 | 11 | 15 | ... | 15 | 14 | 0 |
| 21 | 12 | 16 | ... | 16 | 13 | 1 |
| ... | ... | ... | ... | ... | ... | ... |
| 19 | 11 | 15 | ... | 15 | 14 | 0 |

⇓ NORMALIZATION

| ROOM TEMPERATURE | OUTSIDE TEMPERATURE | FEATURE VECTOR ||||| LABEL |
|---|---|---|---|---|---|---|
| | | RADIATION TEMPERATURE IN AREA L | ... | RADIATION TEMPERATURE IN AREA C | RADIATION TEMPERATURE IN AREA R | |
| -0.5 | -0.77 | -1.14 | ... | -0.23 | 0.23 | 0 |
| 0.5 | 0.00 | 0.23 | ... | 0.23 | -0.23 | 0 |
| 1 | 0.77 | 0.68 | ... | 0.68 | -0.68 | 1 |
| | | | ... | | | ... |
| 0 | 0.00 | 0.23 | ... | 0.23 | -0.23 | 0 |

| Left | Center | Right |
|---|---|---|
| 8/3 AROUND 10:00 | NONE | 8/3 AROUND 17:00 |
| 8/4 AROUND 10:30 | | 8/8 AROUND 19:00 |
| 8/7 AROUND 10:10 | | |
| 8/8 AROUND 11:00 | | |
| 8/9 AROUND 10:00 | | |

EXCLUDE UNAVOIDABLE CASE

| Left | Center | Right |
|---|---|---|
| 8/3 AROUND 10:00 | NONE | 8/3 AROUND 17:00 |
| ~~8/4 AROUND 10:30~~ | | ~~8/8 AROUND 19:00~~ |
| 8/7 AROUND 10:10 | | |
| ~~8/8 AROUND 11:00~~ | | |
| ~~8/9 AROUND 10:00~~ | | |

CONTROL METHOD, COMPUTER-READABLE RECORDING MEDIUM STORING CONTROL PROGRAM, AND AIR CONDITIONING CONTROL DEVICE

CROSS-REFERENCE TO RELATED APPLICATION

This application is a continuation application of International Application PCT/JP2019/033811 filed on Aug. 28, 2019 and designated the U.S., the entire contents of which are incorporated herein by reference.

FIELD

The embodiments discussed herein are related to a control method, a control program, and an air conditioning control device.

BACKGROUND

A cooperation system is used in which a cloud that controls an air conditioner such as an air-conditioning machine and an edge cooperate with each other to make a room temperature comfortable for a user. For example, a cloud server leans a prediction model for predicting contents of the air conditioning control using information collected from each edge to be subject to the air conditioning control, and distributes it to each edge. Then, each edge infers the contents of the air conditioning control using the distributed prediction model to execute the air conditioning control according to the inference result.

Japanese Laid-open Patent Publication No. 2018-71885, International Publication Pamphlet No. WO 2014/174871, and International Publication Pamphlet No. WO 2014/182934 are disclosed as related art.

SUMMARY

According to an aspect of the embodiments, a control method for causing a computer to perform a process includes: obtaining a trained model for each area of a plurality of areas; detecting a first radiation temperature for each of the areas; blowing blowout air to an area where temperature unevenness is predicted among the plurality of areas on a basis of the detected first radiation temperature for each of the areas and the trained model; detecting a second radiation temperature for the area after the blowout air is blown; and executing re-training of the trained model on a basis of a label related to temperature unevenness created on a basis of the second radiation temperature and the second radiation temperature.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating exemplary information stored in a log database (DB);

FIG. 6 is a diagram for explaining exemplary determination of temperature unevenness;

FIG. 7 is a diagram for explaining exemplary generation of learning data;

FIG. 8 is a diagram for explaining exemplary generation of learning data;

DESCRIPTION OF EMBODIMENTS

In recent years, it is common that each edge detects temperature unevenness in a specific area using a radiation sensor, and then controls a wind direction to eliminate the temperature unevenness. Furthermore, a method of determining whether temperature unevenness is likely to occur on the basis of rules on the basis of the current wind direction and the time during which the wind direction has been maintained, and a method of predicting the influence on an environment sensor with reliability by performing control to maintain the environment of one space within a specified temperature range have also been known.

Meanwhile, a situation and area in which temperature unevenness occurs changes depending on a room just as a time period in which the temperature unevenness occurs differs between an east-facing room and a west-facing room. Furthermore, the area or the like where the temperature unevenness occurs also changes due to seasonal changes, changes in furniture layout, or the like.

Therefore, continuous use of a prediction model learned using learning data of a certain room at a certain time distributed from the cloud side causes deterioration of prediction accuracy, and an uncomfortable time for the user is likely to occur. Note that, although a method of always carrying out regular relearning is conceivable, the calculation cost for the learning is enormous, and there is a possibility that a favorable prediction model is replaced by a prediction model with lower accuracy.

In one aspect, it aims to provide a control method, a control program, and an air conditioning control device capable of improving user comfort.

Hereinafter, embodiments of a control method, a control program, and an air conditioning control device will be described in detail with reference to the drawings. Note that the embodiments are not limited to the present disclosure. Furthermore, each of the embodiments may be appropriately combined within a range without inconsistency.

First Embodiment

[Exemplary Overall Configuration]

Figure 1:
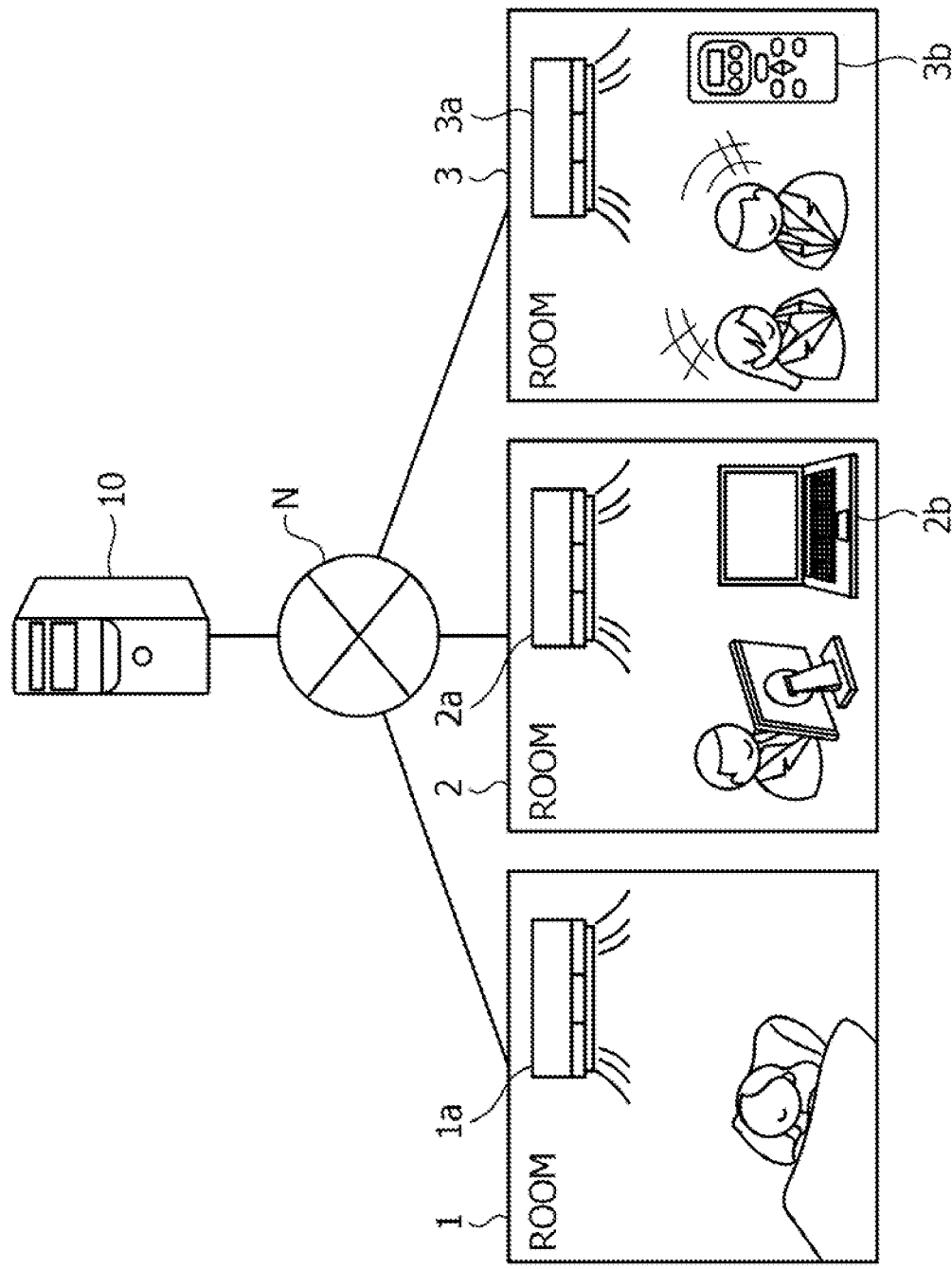
FIG. 1 is a diagram illustrating an exemplary overall configuration of a system according to a first embodiment.

FIG. 1 is a diagram illustrating an exemplary overall configuration of a system according to a first embodiment. As illustrated in FIG. 1, the system is an air conditioning control system in which a cloud server cooperates with an edge, which is a system in which a cloud server 10 as an exemplary air conditioning control device is communicably connected to a communication device in each room corresponding to an edge via a network N. Note that, as the network N, various communication networks such as the Internet may be adopted regardless of wired or wireless communication.

Each room is an example of the edge to be controlled by the cloud server 10. For example, a room 1 includes an air conditioner 1a that is installed in the room and controls air conditioning in the room. A room 2 includes an air conditioner 2a that is installed in the room and controls air conditioning in the room, and an information terminal 2b that transmits an air conditioning control instruction to the air conditioner 2a using a wireless network, universal plug and play (UPnP), or the like. Furthermore, a room 3 includes an air conditioner 3a that is installed in the room and controls air conditioning in the room, and a remote controller 3b that transmits an air conditioning control instruction to the air conditioner 3a.

Furthermore, although illustration is omitted, a sensor that measures an outside temperature, a sensor that measures a temperature and humidity inside the room, and the like are provided in each room. Furthermore, sensor values sensed by various sensors (which may be referred to as observed value or log) may be transmitted to the cloud server 10 by the respective sensors or the like. Furthermore, each air conditioner and each edge terminal may collect an operation log or the like in which on/off of the air conditioning control is associated with time to transmit it to the cloud server 10. Note that, although a case of three rooms has been described here, it is merely an example, and does not limit the number of rooms and the like.

Since each of such rooms has windows, cooling equipment, heating equipment, and the like, temperature unevenness occurs in the entire room even when cooling or heating is carried out. Note that the temperature unevenness indicates an example of a state in which the room temperature of the entire room is not uniform and is in a non-uniform state, for example. In view of the above, in the first embodiment, occurrence of temperature unevenness in each area of the edge is predicted using a prediction model distributed from the cloud server 10 to each edge, and a wind direction is controlled so that the temperature unevenness does not occur.

Figure 2:
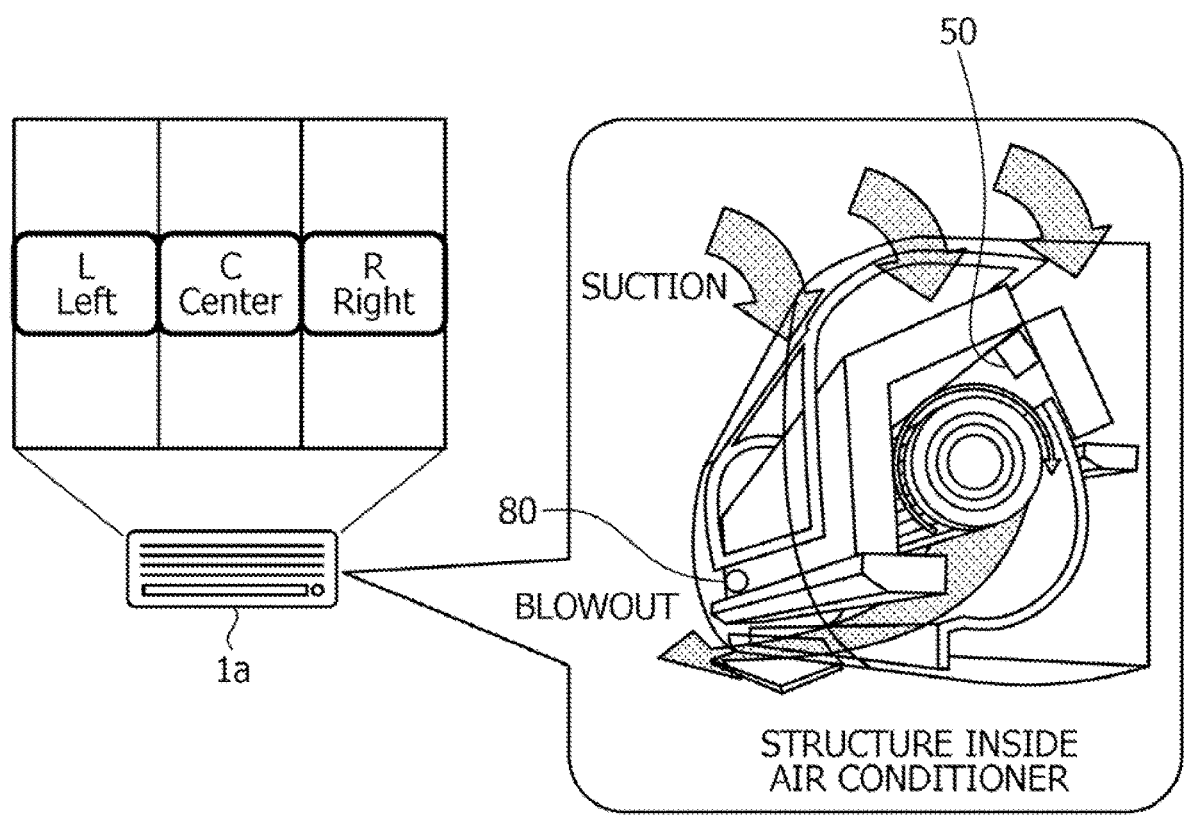
FIG. 2 is a diagram for explaining an area on an edge side.

FIG. 2 is a diagram for explaining an area on the edge side. As illustrated in FIG. 2, each room is divided into a left side (L), a center side (C), and a right side (R). Furthermore, the air conditioner 1a is an example of an air-conditioning machine or the like, and includes a radiation sensor 80 and an edge terminal 50. For example, the air conditioner 1a includes a heat exchanger, a ventilation fan, a drain pan, a filter, a wind direction louver, an outlet, and the like, and takes in the air in the room and blows out warmed or cooled air as blowout air, thereby controlling the air conditioning in the room. Note that, although an example of dividing the room into three areas will be described as an example here, any area may be optionally set as long as it is two or more areas.

The radiation sensor 80 is a measuring instrument that is installed on the front surface of the air conditioner 1a and measures a radiation temperature in each area (L, C, or R) of each room. The radiation sensor 80 transmits the measured radiation temperature in each area to the edge terminal 50 or to the cloud server 10. At this time, an identifier or the like may be added and transmitted to makes it possible to identify which area of which room the radiation temperature pertains to.

The edge terminal 50 is an example of a computer capable of communicating with the cloud server 10, the radiation sensor 80, and the air conditioner 1a. The edge terminal 50 retains a prediction model for each area distributed from the cloud server 10. Then, the edge terminal 50 predicts whether or not temperature unevenness will occur in each area after a predetermined time (e.g., 5 minutes) from the prediction time using each prediction model. Then, the edge terminal 50 controls the wind direction, air volume, and the like of the air conditioner 1a so that cooling or the like is carried out in the area where the temperature unevenness is predicted to occur.

Figure 3:
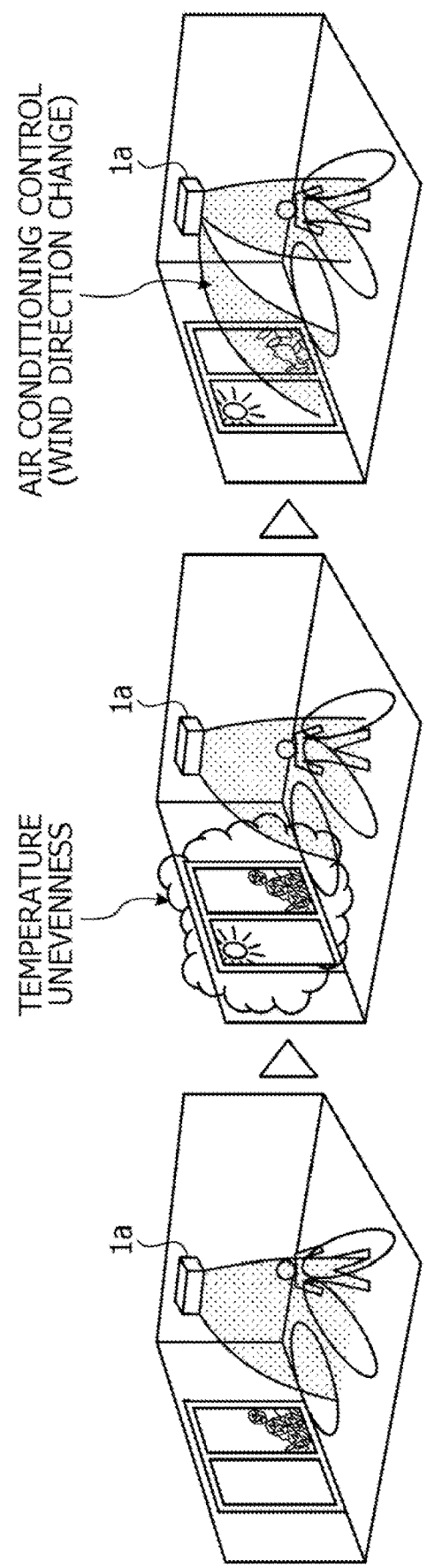
FIG. 3 is a diagram for explaining exemplary air conditioning control.

FIG. 3 is a diagram for explaining exemplary air conditioning control. As illustrated in FIG. 3, the edge terminal 50 predicts occurrence of temperature unevenness using individual prediction models corresponding to respective areas. Then, in a case where occurrence of temperature unevenness is predicted in an area R with a window, the edge terminal 50 controls the wind direction of the air conditioner 1a in such a manner that the air volume directed to the area R increases. With this arrangement, the edge terminal 50 is enabled to execute the air conditioning control before the occurrence of the temperature unevenness, whereby it becomes possible to suppress the occurrence of the temperature unevenness in advance, and to improve user comfort.

[Functional Configuration]

Figure 4:
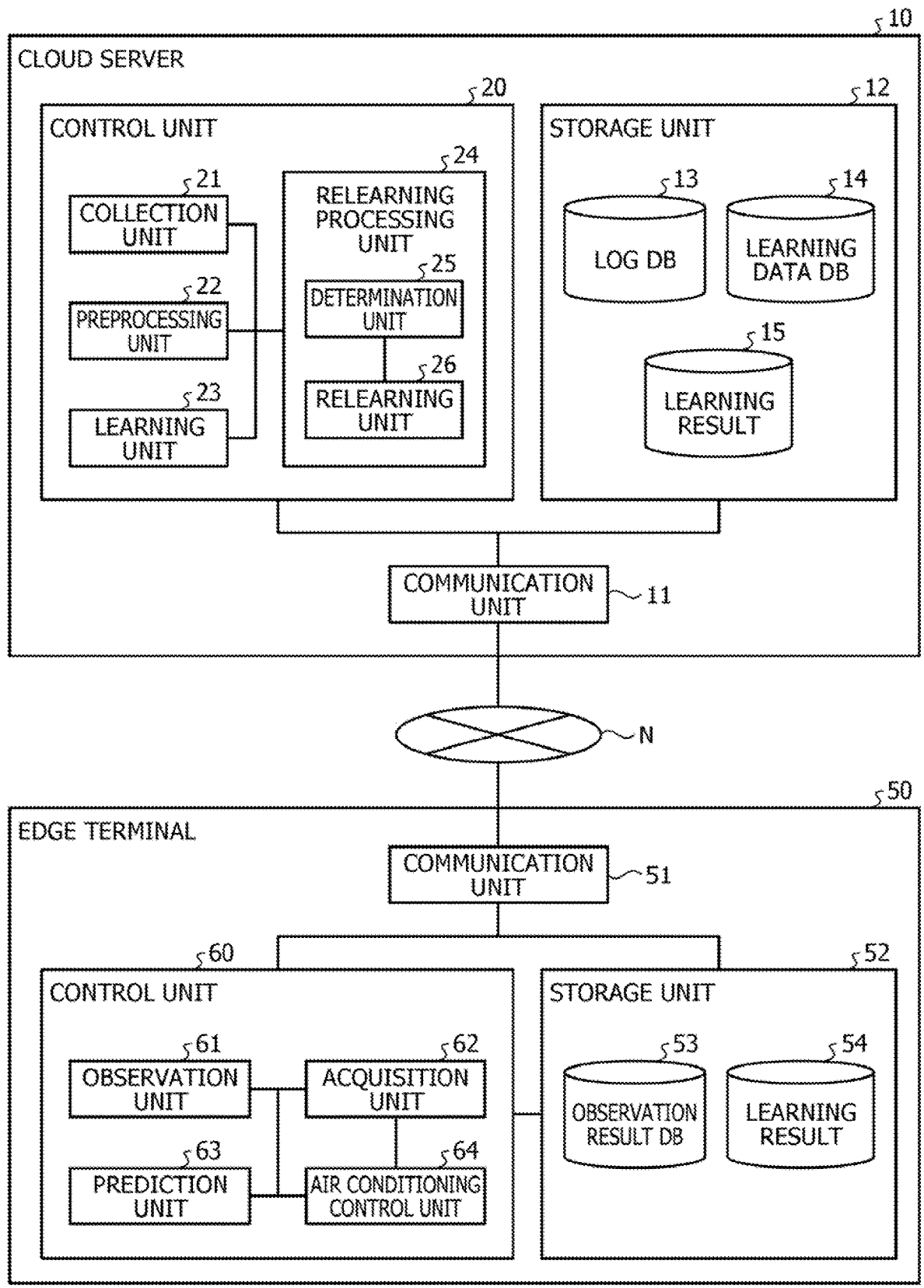
FIG. 4 is a functional block diagram illustrating a functional configuration of the system according to the first embodiment.

FIG. 4 is a functional block diagram illustrating a functional configuration of the system according to the first embodiment. Here, a function of the cloud server 10 and a function of the edge terminal 50 will be described. Furthermore, while an example in which the cloud server 10 performs learning, distribution, and the like of the prediction model on the edge terminal 50 will be described, the cloud server 10 performs similar processing on another edge terminal as well.

(Functional Configuration of Cloud Server 10)

As illustrated in FIG. 4, the cloud server 10 includes a communication unit 11, a storage unit 12, and a control unit 20. The communication unit 11 is a processing unit that controls communication between other devices, which is, for example, a communication interface or the like. For example, the communication unit 11 receives various logs from each edge terminal, and transmits each prediction model to each edge terminal.

The storage unit 12 is an example of a storage device that stores data, programs to be executed by the control unit 20, and the like, which is, for example, a memory, a processor, or the like. The storage unit 12 stores a log DB 13, a learning data DB 14, and a learning result 15.

The log DB 13 is a database that stores log information associated with the air conditioning control of the edge collected from a meteorological server (not illustrated) that manages the edge terminal of each edge and meteorological data such as a temperature of each region. FIG. 5 is a diagram illustrating an example of the information stored in the log DB 13. As illustrated in FIG. 5, the log DB 13 stores, for each edge, "time, a room temperature, an outside temperature, a radiation temperature in an area L, a radiation temperature in an area C, and a radiation temperature in an area R" in association with each other.

The "time" stored here indicates time at which measurement is carried out, and the "room temperature" indicates a temperature in the edge (room). The "outside temperature" indicates a temperature outside the edge, which may be collected by a meteorological server or the like. The "radiation temperature in the area L" indicates a radiation temperature in the area L of the edge, the "radiation temperature in the area C" indicates a radiation temperature in the area C of the edge, and the "radiation temperature in the area R" indicates a radiation temperature in the area R of the edge. Note that the log illustrated here is an example, and information other than those, such as humidity, for example, may also be collected.

The learning data DB 14 is a database that stores learning data used to learn various prediction models. The information stored here is generated by a preprocessing unit 22 and the like to be described later, and details will be described later.

The learning result 15 is information associated with a learned prediction model. For example, the learning result 15 is various parameters of the learned prediction model. Furthermore, the learning result 15 may also be the learned prediction model itself in which various parameters are set.

The control unit 20 is a processing unit that controls the entire cloud server 10, and is, for example, a processor or the like. The control unit 20 includes a collection unit 21, a preprocessing unit 22, a learning unit 23, and a relearning processing unit 24. Note that the collection unit 21, the preprocessing unit 22, the learning unit 23, the relearning processing unit 24 are exemplary electronic circuits included in a processor, exemplary processes executed by the processor, and the like.

The collection unit 21 is a processing unit that collects logs from each edge terminal. For example, the collection unit 21 collects the above radiation temperature and the like from the edge terminal 50 of an edge A, collects meteorological data such as an ambient temperature from the meteorological server, and generates log information in which data at the same time are summarized to store it in the log DB 13. Note that the timing of collection may also be a predetermined timing, may also be periodic, or may be optionally set. Furthermore, the collection unit 21 collects logs and the like even after the learning of the prediction model is complete or the prediction model is distributed to each edge.

The preprocessing unit 22 is a processing unit that executes preprocessing such as generation of learning data before learning the prediction model. Specifically, for example, the preprocessing unit 22 detects an occurrence status of temperature unevenness with reference to the log DB 13, generates learning data using the occurrence status of the temperature unevenness, and executes normalization of the learning data.

(Determination of Temperature Unevenness)

The preprocessing unit 22 is capable of determining occurrence of temperature unevenness in each area on the basis of a relative relationship between the radiation temperatures in the respective areas. FIG. 6 is a diagram for explaining exemplary determination of temperature unevenness. FIG. 6 illustrates log information of the edge A. As illustrated in FIG. 6, since the radiation temperature in the area L is away from the radiation temperatures of other areas by equal to or more than a threshold value (e.g., 2 degrees) at time t0, the preprocessing unit 22 determines that temperature unevenness has occurred in the area L. Furthermore, since the difference in radiation temperature in each area is less than a threshold value (e.g., 2 degrees) at time t1, the preprocessing unit 22 determines that no temperature unevenness has occurred. Furthermore, since the radiation temperature in the area R is away from the radiation temperatures of other areas by equal to or more than a threshold value (e.g., 2 degrees) at time t2, the preprocessing unit 22 determines that temperature unevenness has occurred in the area R. Note that the preprocessing unit 22 is also capable of storing the occurrence result of the temperature unevenness in the storage unit 12 or the like.

(Generation of Learning Data)

Subsequently, the preprocessing unit 22 generates learning data to be used for learning the prediction model for each area using the determination result of temperature unevenness and the log, and stores it in the learning data DB 14. Specifically, for example, the preprocessing unit 22 sets, for each log illustrated in FIG. 5, a label indicating whether or not temperature unevenness has occurred after a predetermined time has elapsed (e.g., after 5 minutes) from the collection time of the log, and generates learning data with each log as a feature vector (explanatory variable) and a label as an objective variable.

FIGS. 7 and 8 are diagrams for explaining exemplary generation of learning data. While FIG. 7 explains learning data generation for the area L and FIG. 8 explains learning data generation for the area R, the area C may be processed in a similar manner.

As illustrated in FIG. 7, in a case where temperature unevenness has occurred in the area L 5 minutes after the time of the log for one feature vector (log), the preprocessing unit 22 sets a label "1" for the log. On the other hand, in a case where no temperature unevenness has occurred in the area L after 5 minutes, the preprocessing unit 22 sets a label "0" for the log. In this manner, the preprocessing unit 22 assigns a label to the log stored in the log DB 13 depending on the temperature unevenness occurrence status of the area L, and generates learning data for the area L.

Thereafter, the preprocessing unit 22 normalizes the learning data for the area L, and stores it in the learning data DB 14. For example, the preprocessing unit 22 normalizes a numerical value $x_i$ of each learning data with $((x_i-\mu)/\sigma)$ using an average $\mu$ and standard deviation $\sigma$ of each column of the learning data. For example, explaining the radiation temperature in the area L as an example, the preprocessing unit 22 calculates the average $\mu$ and the standard deviation $\sigma$ of the radiation temperatures "12, 15, 16, . . . , and 15" in the area L. Then, the preprocessing unit 22 normalizes the radiation temperatures "12, 15, 16, . . . , and 15" in the area L to be "$((12-\mu)/\sigma)$, $((15-\mu)/\sigma)$, and so on".

Furthermore, as illustrated in FIG. 8, the preprocessing unit 22 sets a label "1" in a case where temperature unevenness has occurred in the area R 5 minutes after the time of the log for one feature vector (log), and sets a label "0" in a case where no temperature unevenness has occurred in the area R after 5 minutes. In this manner, the preprocessing unit 22 assigns a label to the log stored in the log DB 13 depending on the temperature unevenness occurrence status of the area R, and generates learning data for the area R. Thereafter, the preprocessing unit 22 performs normalization similar to the processing described above, and stores it in the learning data DB 14.

Note that it is also possible to generate, for each edge, learning data using logs collected from all edges. Furthermore, it is also possible to perform clustering according to characteristics of each edge to generate learning data using logs of edges belonging to the same cluster.

Returning to FIG. 4, the learning unit 23 is a processing unit that learns the prediction model for each edge area. Specifically, for example, the learning unit 23 reads, from the learning data DB 14, the learning data for the area L in the certain room 1 to be subject to the air conditioning control of the edge terminal 50, and learns the prediction model for the area L. Furthermore, the learning unit 23 reads the learning data for the area C from the learning data DB 14 to learn the prediction model for the area C, and reads the learning data for the area R from the learning data DB 14 to learn the prediction model for the area R.

Here, as an example, the learning unit 23 leans each prediction model using logistic regression or a neural network. For example, the learning unit 23 inputs a linear regression equation expressed by an equation (1) into a sigmoid function expressed by an equation (2), and obtains a value obtained by the equation (2) as a logistic regression model. Here, an explanatory variable is input to X in the equation (1), y represents an objective variable, w represents a weight, and b represents a predetermined constant.

$$y = wX + b \quad \text{Equation (1)}$$

$$z = 1/(1 + e^{-y}) \quad \text{Equation (2)}$$

Figure 9A:
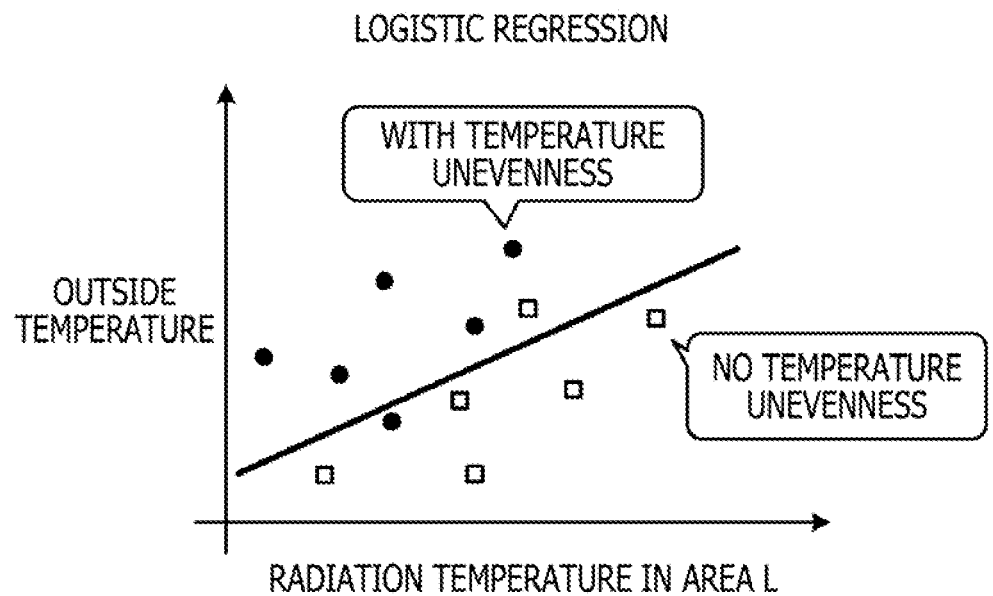
FIG. 9A is a diagram for explaining exemplary learning.

In the example of FIG. 7, the learning unit 23 inputs the feature vector to X in the equation (1), and inputs the label to y, thereby learning a prediction model L for the area L to which the logistic regression is applied. As a result, as illustrated in FIG. 9A, it becomes possible to learn a linear model that makes a classification into "with temperature unevenness" and "no temperature unevenness". Note that FIG. 9A is a diagram for explaining exemplary learning. While FIG. 9A illustrates a two-dimensional relationship between the radiation temperature in the area L and the outside temperature as an example to simplify the explanation, it is merely an example.

Figure 9B:
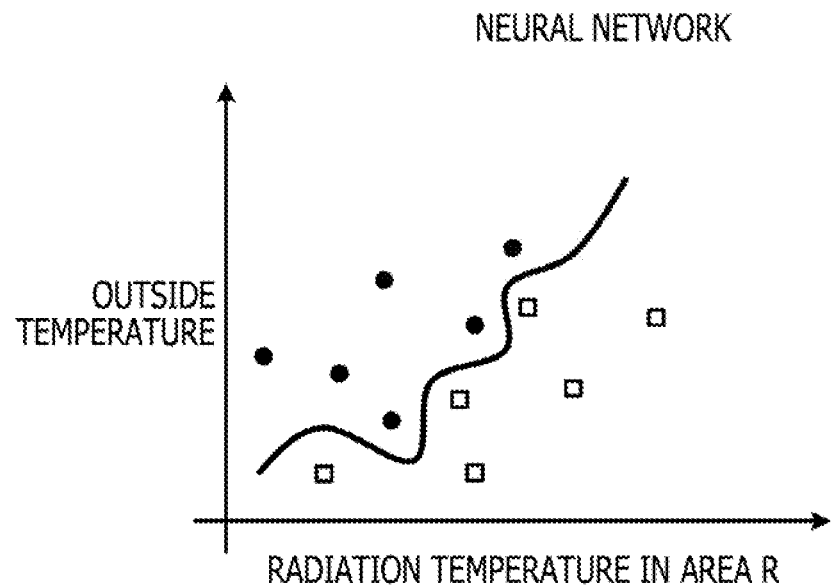
FIG. 9B is a diagram for explaining exemplary learning.

As an alternative, the learning unit 23 is also capable of learning each prediction model R using a neural network. For example, in the example of FIG. 8, the learning unit 23 obtains the feature vector of the first record and the teacher label "0 (no temperature unevenness)", and inputs the feature vector to the neural network. Subsequently, the learning unit 23 obtains a probability (likelihood) that temperature unevenness occurs in the area R after 5 minutes and a probability of no occurrence as an output result of the neural network. Then, the learning unit 23 learns the neural network using an error back propagation method or the like in such a manner that the probability of the teacher label "0 (no temperature unevenness)" increases. According to such a method, as illustrated in FIG. 9B, the learning unit 23 is enabled to learn a non-linear model that makes a classification into "with temperature unevenness" and "no temperature unevenness" by learning the neural network using each learning data. Note that FIG. 9B is a diagram for explaining exemplary learning. While FIG. 9B illustrates a two-dimensional relationship between the radiation temperature in the area R and the outside temperature as an example to simplify the explanation, it is merely an example.

In this manner, the learning unit 23 leans the prediction model L for the area L, the prediction model C for the area C, and the prediction model R for the area R for each edge terminal. Then, when the learning is complete, the learning unit 23 stores the learning result 15 in the storage unit 12. Note that the timing to end the learning may be optionally set, such as a time point at which the learning using all the learning data is complete, a time point at which the learning using equal to or more than a predetermined number of learning data is complete, or a time point at which a restoration error falls under a threshold value.

Then, the learning unit 23 distributes the learning result to each edge terminal. For example, the learning unit 23 obtains, from the learning result 15, parameters of the prediction model L learned for the area L, parameters of the prediction model C learned for the area C, and parameters of the prediction model R learned for the area R, and distributes them to the edge terminal 50. Note that the learning unit 23 is also capable of transmitting scale information associated with normalization and the like.

Returning to FIG. 4, the relearning processing unit 24 includes a determination unit 25 and a relearning unit 26, and is a processing unit that identifies an area where temperature unevenness has occurred even after the prediction model is distributed and executes relearning of the prediction model corresponding to the area.

The determination unit 25 is a processing unit that determines whether or not it is the area where temperature unevenness has occurred after the prediction model is distributed. Specifically, for example, the determination unit 25 obtains, from the log DB 13, logs after the prediction model is distributed among the logs collected from the edge terminal 50, and counts the number of times of temperature unevenness occurrence in each area using the method of FIG. 6, thereby determining the area where the temperature unevenness has occurred. For example, the determination unit 25 determines whether or not temperature unevenness has occurred from the state after the air conditioning control is performed on the area where the temperature unevenness is predicted to occur.

Figure 10:
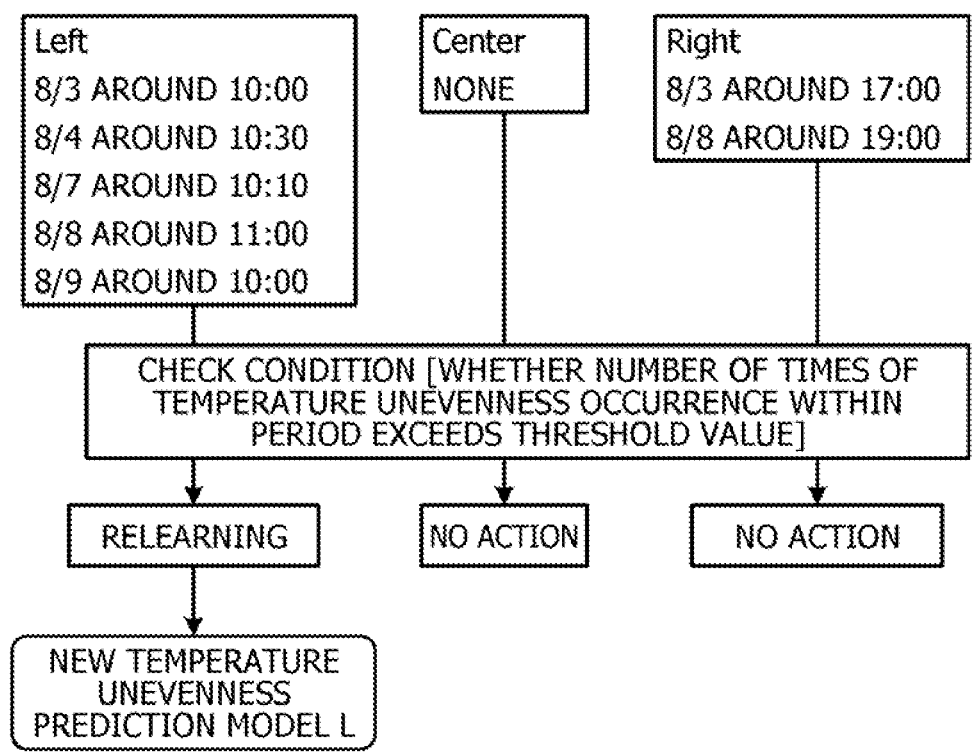
FIG. 10 is a diagram for explaining exemplary determination of relearning.

FIG. 10 is a diagram for explaining exemplary determination of relearning. As illustrated in FIG. 10, the determination unit 25 detects 5 times for the area L, 0 times for the area C, and twice for the area R as a temperature unevenness occurrence status after the prediction model is distributed. Then, since the number of times of occurrence in the area L (5 times) is equal to or more than a threshold value (e.g., 3 times), the determination unit 25 determines that the reliability of the prediction model L is degraded, and requests the relearning unit 26 to relearn the prediction model L for the area L. Note that, since highly reliable results are obtained for the area C and the area R with the current prediction model, relearning is not performed. In this manner, the determination unit 25 determines the necessity or unnecessity of the relearning for each area.

The relearning unit 26 is a processing unit that executes the relearning of the prediction model with degraded reliability among the distributed prediction models of respective areas. Specifically, for example, the relearning unit 26 executes the relearning only for the prediction model of the area notified from the determination unit 25, and stores a result of the relearning in the storage unit 12 as the learning result 15. For example, the relearning unit 26 updates the prediction model using the log of the result of the air conditioning control performed in such a manner that temperature unevenness does not occur according to the prediction result by the distributed prediction model. Then, the relearning unit 26 distributes the relearning result to the edge terminal.

Explaining with the above example, the relearning unit 26 generates learning data for the prediction model L using the method described with reference to FIGS. 7 and 8 to learn the prediction model L whose reliability is degraded. At this time, it is also possible to generate the learning data from all the logs, and is also possible to generate the learning data from the logs collected after the previous prediction model distribution. Then, when the relearning of the prediction model L is complete, the relearning unit 26 distributes the parameters of the relearned prediction model L to the edge terminal 50. Note that a method similar to that of the learning unit 23 may be used as a relearning method.
(Functional Configuration of Edge Terminal 50)

As illustrated in FIG. 4, the edge terminal 50 includes a communication unit 51, a storage unit 52, and a control unit 60. The communication unit 51 is a processing unit that controls communication between other devices, which is, for example, a communication interface or the like. For example, the communication unit 51 transmits various logs to the cloud server 10, and receives a learning result from the cloud server 10.

The storage unit 52 is an example of a storage device that stores data, programs to be executed by the control unit 60, and the like, which is, for example, a memory, a processor, or the like. The storage unit 52 stores an observation result DB 53 and a learning result 54. Note that the storage unit 52 is also capable of storing the occurrence result and the prediction result of the temperature unevenness.

The observation result DB 53 is a database that stores information associated with the air conditioning control of the air conditioner 1a and information associated with the room to be subject to the air conditioning control. For example, the observation result DB 53 stores a room temperature, a radiation temperature of each area, and the like in association with observation time.

The learning result 54 is information associated with a learned prediction model. For example, the learning result 54 is various parameters of the learned prediction model distributed from the cloud server 10, or the like, and information similar to the learning result 15 of the cloud server 10 is stored.

The control unit 60 is a processing unit that controls the entire edge terminal 50, and is, for example, a processor or the like. The control unit 60 includes an observation unit 61, an acquisition unit 62, a prediction unit 63, and an air conditioning control unit 64. Note that the observation unit 61, the acquisition unit 62, the prediction unit 63, and the air conditioning control unit 64 are exemplary electronic circuits included in a processor, exemplary processes executed by the processor, and the like.

The observation unit 61 is a processing unit that observes a room temperature, radiation temperature, and the like in the room. For example, the observation unit 61 obtains a radiation temperature of each area in the room from the radiation sensor included in the air conditioner 1a equipped with the edge terminal 50 or capable of wirelessly communicating with the edge terminal 50. Furthermore, the observation unit 61 obtains a room temperature from a temperature sensor included in the air conditioner 1a, and obtains a temperature outside the room (outside temperature) from an external meteorological server, an exterior unit, or the like. The observation unit 61 stores, as a log, the observed value obtained in this manner in the observation result DB 53. Furthermore, the observation unit 61 transmits the log (observed value) included in the observation result DB 53 to the cloud server 10.

The acquisition unit 62 is a processing unit that obtains information associated with the learned prediction model from the cloud server 10. For example, the acquisition unit 62 obtains, from the cloud server 10, various parameters for constructing a prediction model for each area, and stores them in the learning result 54.

The prediction unit 63 is a processing unit that predicts occurrence of temperature unevenness in advance using the prediction model for each area learned by the cloud server 10. For example, the prediction unit 63 reads, from the learning result 54, parameters of the prediction model L learned for the area L, parameters of the prediction model C learned for the area C, and parameters of the prediction model R learned for the area R, and constructs the prediction model L, the prediction model C, and the prediction model R.

Then, the prediction unit 63 obtains, from the observation result DB 53, the current observed values "room temperature, outside temperature, and radiation temperature in each area", which are items similar to the learning data, and inputs them to the prediction model L, the prediction model C, and the prediction model R. Thereafter, the prediction unit 63 predicts occurrence of temperature unevenness on the basis of the output result of each prediction model. That is, for example, in a case where the prediction model relearned by the cloud server 10 is stored in the learning result 54, the prediction unit 63 executes prediction using the prediction model after the relearning.

The air conditioning control unit 64 is a processing unit that executes air conditioning control according to the prediction result of the prediction unit 63. For example, the air conditioning control unit 64 changes the wind direction of the air conditioner 1a to an area where temperature unevenness is predicted to occur after 5 minutes, and blows blowout air from the air conditioner 1a in such a manner that cooling or the like is intensively carried out. For example, in a case where temperature unevenness is predicted to occur in the area R on the window side after 5 minutes, the air conditioning control unit 64 changes the wind direction to the area R, increases the air volume to the area R, and the like, thereby suppressing the occurrence of the temperature unevenness in advance.

Figure 11:
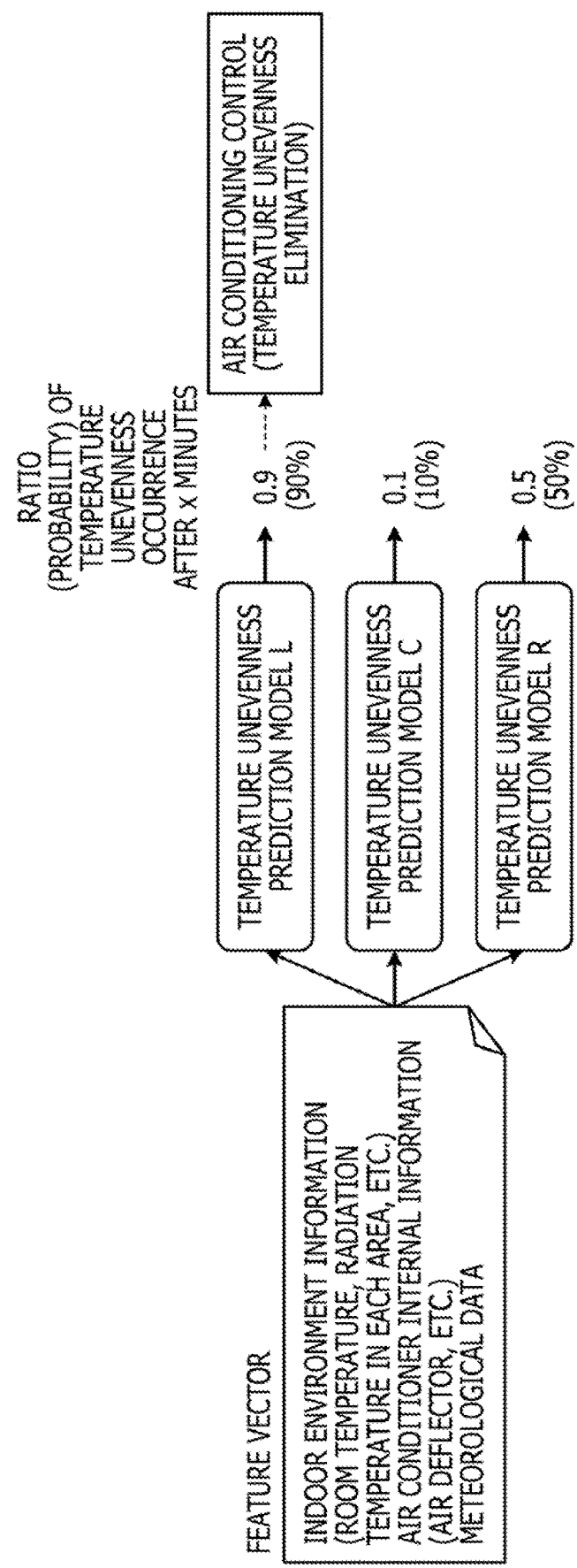
FIG. 11 is a diagram for explaining exemplary air conditioning control for an edge.

FIG. 11 is a diagram for explaining exemplary air conditioning control for the edge. As illustrated in FIG. 11, the prediction unit 63 generates a feature vector from the observed value of the room, and inputs it to each of the prediction model L, the prediction model C, and the prediction model R. Then, the prediction unit 63 obtains a ratio (probability) of temperature unevenness occurrence after x (e.g., five) minutes from each prediction model. Here, it is assumed that "0.9 (90%)" is output from the prediction model L, "0.1 (10%)" is output from the prediction model C, and "0.5 (50%)" is output from the prediction model R.

In this case, the prediction unit 63 identifies the prediction model L having the probability equal to or higher than a threshold value (e.g., 70%), and determines that temperature unevenness is likely to occur in the area L. As a result, the air conditioning control unit 64 executes the air conditioning control for the area L. Note that, although an example of predicting occurrence of temperature unevenness in one area has been described here, temperature unevenness may be predicted in a plurality of areas simultaneously. In that case, the prediction unit 63 increases the air volume to each predicted area or the like to suppress the occurrence of the temperature unevenness in advance.

[Process Flow]

Next, each of a learning process, a relearning process, and an air conditioning control process to be executed in the system described above will be described. Note that the learning process and the relearning process to be described here are executed by the cloud server 10 for each edge, and the air conditioning control process is executed in each edge.

(Learning Process)

Figure 12:
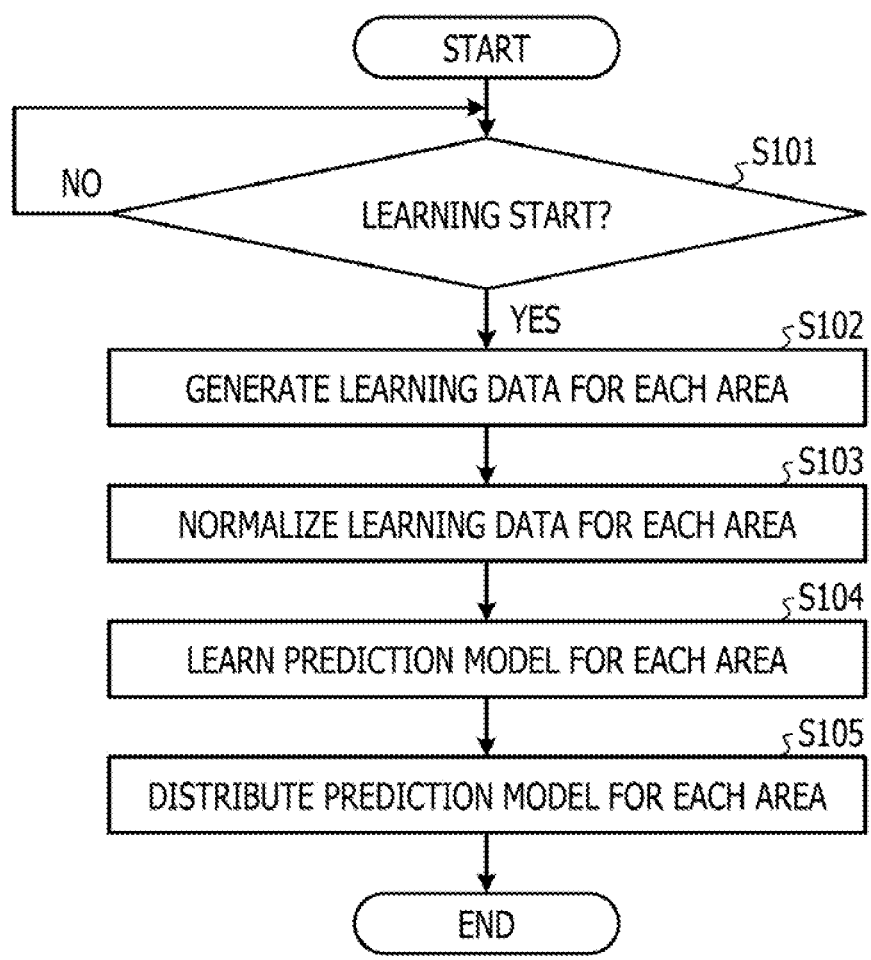
FIG. 12 is a flowchart illustrating a flow of a learning process.

FIG. 12 is a flowchart illustrating a flow of the learning process. As illustrated in FIG. 12, when an administrator or the like instructs a learning start (Yes in S101), the preprocessing unit 22 generates learning data for each area (S102), and normalizes the learning data for each area (S103).

Subsequently, the learning unit 23 executes learning of the prediction model for each area (S104), and distributes the prediction model for each area to the edge terminal 50 when the learning is complete (S105). At this time, the learning unit 23 may also transmit scale information associated with normalization.

(Relearning Process)

Figure 13:
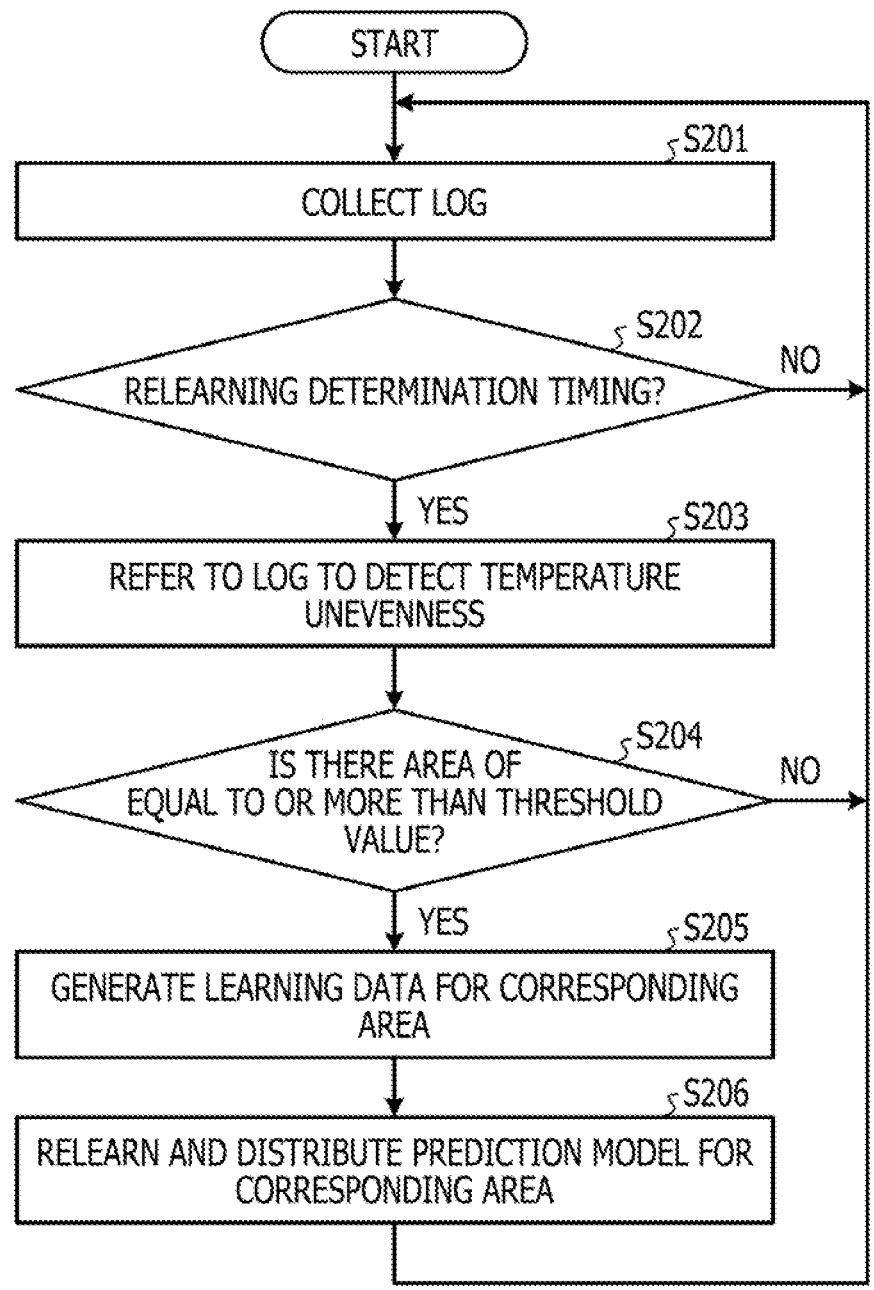
FIG. 13 is a flowchart illustrating a flow of a relearning process.

FIG. 13 is a flowchart illustrating a flow of the relearning process. As illustrated in FIG. 13, the relearning processing unit 24 collects logs from each edge terminal even after the prediction model is distributed (S201), and when the relearning determination timing is reached (Yes in S202), it refers to the collected logs to detect temperature unevenness (S203).

Then, if there is no area where the number of times of temperature unevenness occurrence is equal to or more than a threshold value (No in S204), the relearning processing unit 24 suppresses the relearning of the prediction model, and repeats S201 and subsequent steps.

On the other hand, if there is an area where the number of times of temperature unevenness occurrence is equal to or more than the threshold value (Yes in S204), the relearning processing unit 24 generates learning data for the corresponding area (S205). At this time, the relearning processing unit 24 performs normalization of the learning data using the scale information.

Thereafter, the relearning processing unit 24 relearns only the prediction model for the corresponding area using the learning data for the corresponding area, and distributes the prediction model after the relearning to the edge terminal 50 (S206).

(Air Conditioning Control Process)

Figure 14:
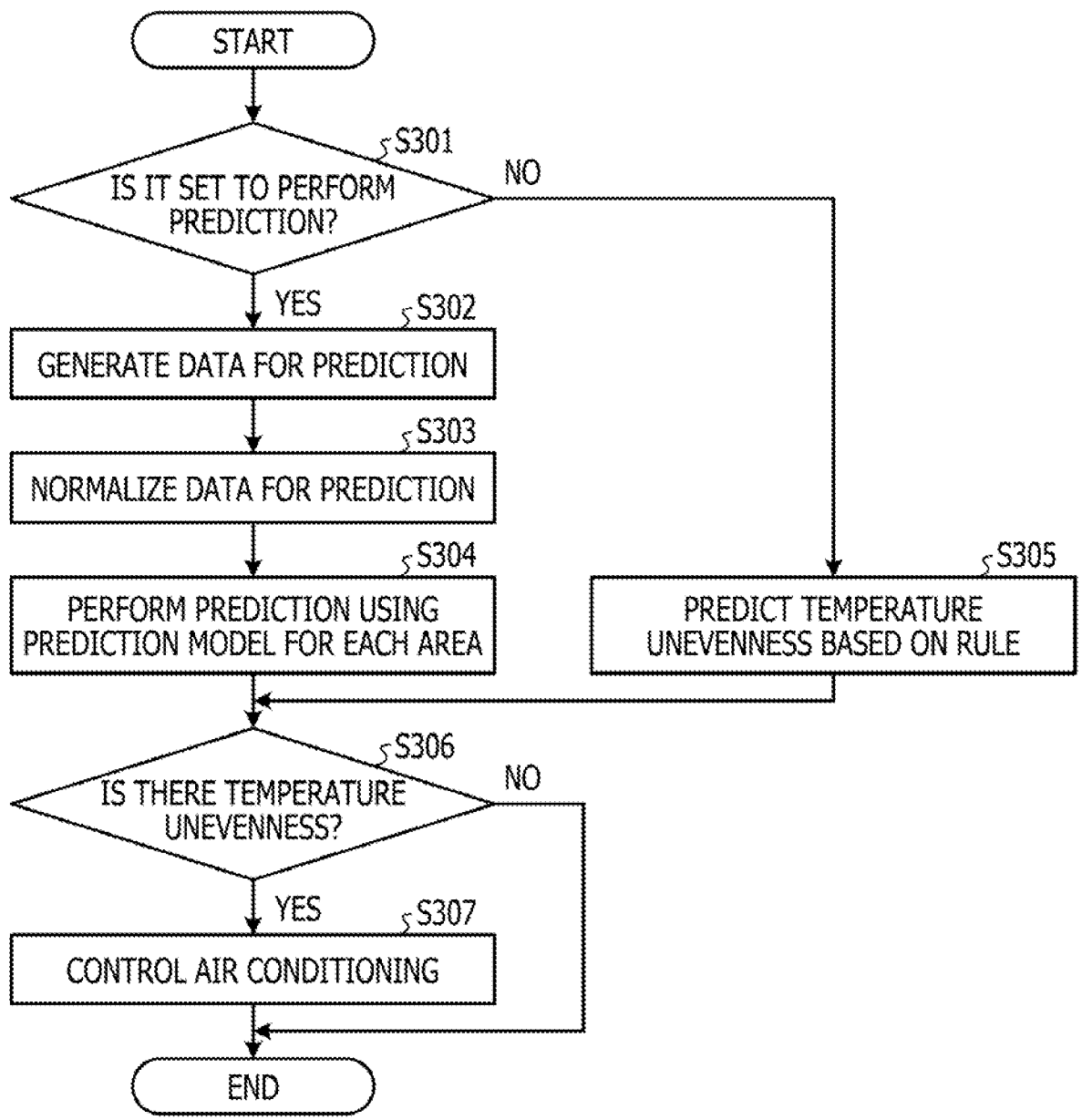
FIG. 14 is a flowchart illustrating a flow of an air conditioning control process.

FIG. 14 is a flowchart illustrating a flow of the air conditioning control process. As illustrated in FIG. 14, the prediction unit 63 of the edge terminal 50 determines whether or not the air conditioner 1a is set to perform prediction using a prediction model (S301).

Here, if it is set to perform the prediction using a prediction model (Yes in S301), the prediction unit 63 generates data for prediction (S302), and normalizes the data for prediction using scale information similar to that at the time of learning (S303).

Then, the prediction unit 63 predicts occurrence of temperature unevenness in each area using the data for prediction and the prediction model for each area (S304). Furthermore, if it is not set to perform the prediction using a prediction model in S301 (No in S301), the air conditioning control unit 64 detects occurrence of temperature unevenness according to a commonly used predetermined rule of air conditioning control (S305).

Here, if an area where temperature unevenness occurs is predicted (Yes in S306), the air conditioning control unit 64 executes the air conditioning control in such a manner that the temperature unevenness does not occur in the corresponding area (S307). Furthermore, when occurrence of temperature unevenness is detected on the basis of the general rule, the air conditioning control unit 64 executes the air conditioning control to eliminate the temperature unevenness.

[Effects]

As described above, the cloud server 10 generates a prediction model for predicting occurrence of temperature unevenness by machine learning, determines whether to update the prediction model from a frequency of the occurrence of the temperature unevenness while the prediction model is applied, and executes the relearning. As a result, it becomes possible to detect a prediction model with lowered prediction accuracy and to automatically execute the relearning to distribute it to the edge side, whereby it becomes possible to suppress the occurrence of the temperature unevenness as compared with a case of continuously using the same prediction model. Therefore, the cloud server 10 is enabled to improve user comfort, and to create a comfortable space for the user.

Furthermore, the edge terminal 50 is enabled to execute the air conditioning control in the area where temperature unevenness is likely to occur before the temperature unevenness occurs, whereby it becomes possible to suppress the occurrence of the temperature unevenness. Furthermore, the relearning is executed in a case where the prediction accuracy is lowered, whereby it becomes possible to reduce the calculation amount needed to relearn the temperature unevenness prediction model.

Figure 15B:
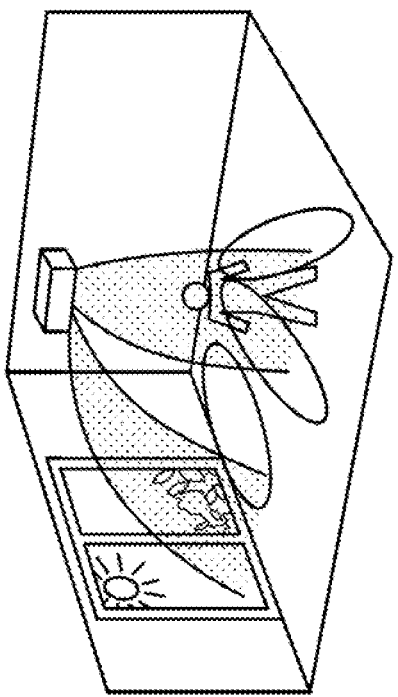
FIGS. 15A and 15B are diagrams for explaining a comparative example.
Figure 15A:
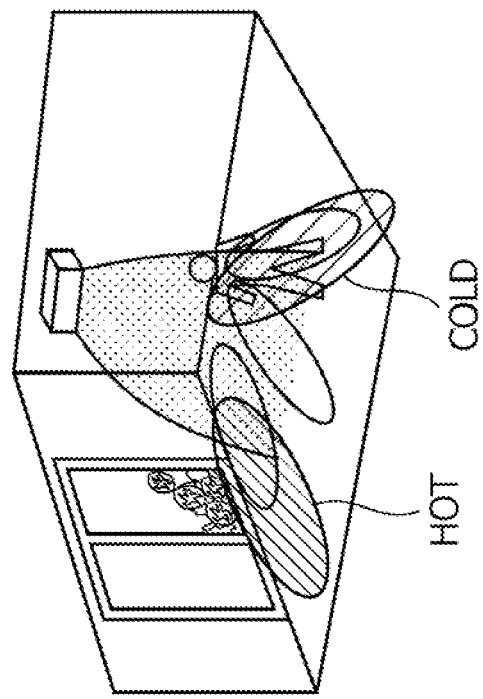

Here, a comparative example between a general technique of detecting temperature unevenness and the temperature unevenness prediction according to the first embodiment will be described. FIGS. 15A and 15B are diagrams for explaining the comparative example. As illustrated in FIG. 15A, a room temperature of one space is controlled according to the general technique, and thus in an area with a window, which is an example of the area affected by the external environment, the window side is heated (cooled) when heat is radiated from the window, whereas the wall side away from the window is cooled (heated), which results in occurrence of temperature unevenness in the space. On the other hand, according to the technique according to the first embodiment, blowout air is applied to the area where temperature unevenness is predicted to occur (predicted to be warmer/cooler) as illustrated in FIG. 15B, whereby it becomes possible to suppress the occurrence of the temperature unevenness. Note that examples of the area affected by the external environment include, in addition to the window, a sofa where people gather, and the like.

Second Embodiment

While the embodiment has been described above, the embodiment may be implemented in a variety of different modes in addition to the above-described embodiment.

[Relearning Determination]

While an example of determining a prediction model to be subject to relearning by counting the number of times of occurrence of temperature unevenness in a certain period for each area has been described in the embodiment above, it is not limited thereto. For example, it is possible to improve determination accuracy in relearning by excluding and counting temperature unevenness that is difficult to eliminate, such as immediately after the start of operation.

Figure 16:
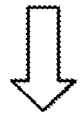
FIG. 16 is a diagram for explaining another exemplary determination of the relearning.

FIG. 16 is a diagram for explaining another exemplary determination of the relearning. As illustrated in FIG. 16, the cloud server 10 counts temperature unevenness after XX minutes (e.g., 60 minutes) or later from the start of operation among the times at which the temperature unevenness has been detected, and does not count the temperature unevenness before that. With this arrangement, it becomes possible to improve determination accuracy of a decrease in prediction accuracy of a prediction model, and to suppress unnecessary relearning. Note that the relearning determination is carried out at predetermined intervals, such as every other week, for example. The definition of the temperature unevenness may be defined as, for example, that a radiation temperature in a certain area is x degrees or more higher than a radiation temperature in another area and the above continues for y minutes, or the like. Note that x and y are any numerical values.

[Target Space]

While a room in a company or the like has been described as an example in the embodiment described above, it is not limited thereto. For example, various spaces such as the inside of a train, car, or the like, a machine room, and the inside of an airplane may be targeted.

[Learning Data, etc.]

The data examples, numerical value examples, display examples, and the like used in the embodiment described above are merely examples, and may be freely modified. Furthermore, the feature vector and the observation data are also examples, and it is also possible to use another kind of observable information such as a direction of an air deflector. While an example of using a logistic regression model or a neural network as a learning model has been described in the embodiment above, it is not limited thereto, and it is also possible to adopt another type of machine learning such as a support vector machine.

[Feature Vector]

A feature vector to be used to learn a prediction model may also be optionally set. For example, it is also possible to lean observation data of 15 minutes before the original time point, observation data of 10 minutes ago, and observation data of 5 minutes ago as one feature vector. Furthermore, while an example of using a feature vector including radiation temperatures of all areas at the time of learning a prediction model of each area has been described in the embodiment above, it is not limited thereto, and for example, it is also possible to set only a radiation temperature of an area to be subject to prediction as a feature vector, or to use a feature vector obtained by multiplying the radiation temperature of the area to be subject to prediction by a weight.

[Numerical Value]

The items of the sensor value, the numerical values, the number of devices, the number of edges, and the like described in the above embodiment are not limited to those illustrated, and it is possible to use information that can be collected by a general sensor or the like. Furthermore, it is also possible to optionally change the prediction of temperature unevenness occurrence such as whether or not it occurs in 10 minutes. In that case, a collection unit of the sensor value or the like is also changed to an optional time.

[System]

Pieces of information including a processing procedure, a control procedure, a specific name, and various data or parameters described above or illustrated in the drawings may be optionally changed unless otherwise specified.

Furthermore, each component of each device illustrated in the drawings is functionally conceptual and does not necessarily have to be physically configured as illustrated in the drawings. For example, specific forms of distribution and integration of each device are not limited to those illustrated in the drawings. That is, for example, all or a part thereof may be configured by being functionally or physically distributed or integrated in optional units depending on various types of loads, usage situations, or the like. Note that it is also possible to execute the detection of temperature unevenness occurrence, the request for relearning, and the like on the side of the edge terminal 50.

Moreover, all or any part of individual processing functions performed in each device may be implemented by a central processing unit (CPU) and a program analyzed and executed by the corresponding CPU, or may be implemented as hardware by wired logic.

[Hardware]

Next, exemplary hardware configurations of the cloud server 10 and the edge terminal 50 will be described. Since the cloud server 10 and the edge terminal 50 have a similar hardware configuration, descriptions will be given as a computer 100 here.

Figure 17:
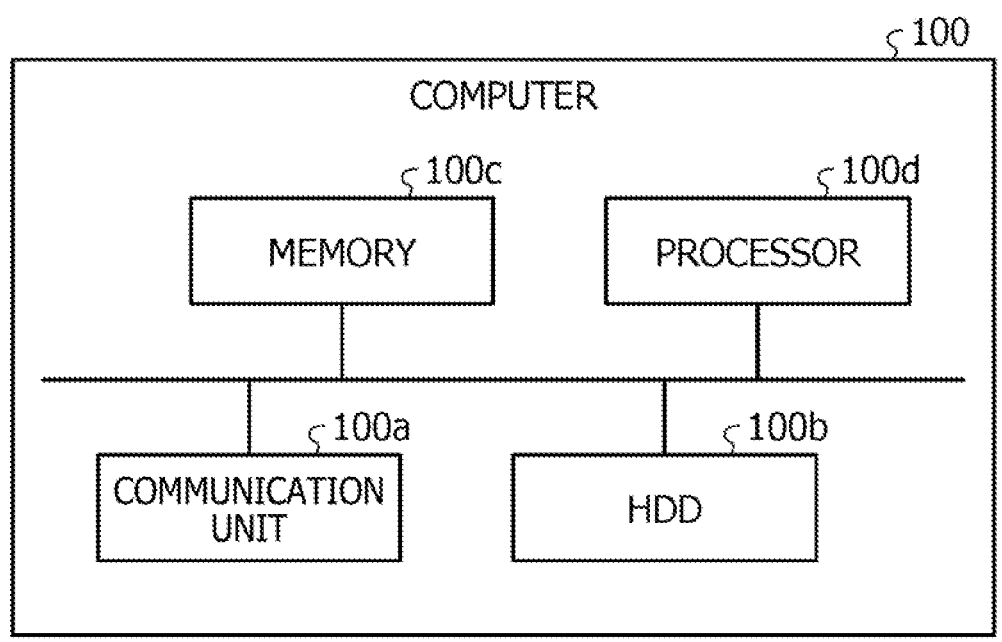
FIG. 17 is a diagram illustrating an exemplary hardware configuration.

Here, FIG. 17 is a diagram illustrating an exemplary hardware configuration. As illustrated in FIG. 17, the computer 100 includes a communication device 100*a*, a hard disk drive (HDD) 100*b*, a memory 100*c*, and a processor 100*d*. Furthermore, each of the units illustrated in FIG. 17 is mutually connected by a bus or the like.

The communication device 100*a* is a network interface card or the like, and communicates with another server. The HDD 100*b* stores programs and DBs for operating the functions illustrated in FIG. 4.

The processor 100*d* reads a program that executes processing similar to the processing of each processing unit illustrated in FIG. 4 from the HDD 100*b* or the like, and loads it into the memory 100*c*, thereby operating a process that executes each function described with reference to FIG. 4 or the like. For example, this process implements a function similar to that of each processing unit included in the computer 100. Specifically, for example, the processor 100*d* reads, from the HDD 100*b* or the like, a program having a function similar to that of the collection unit 21, the preprocessing unit 22, the learning unit 23, the relearning processing unit 24, or the like. Then, the processor 100*d* executes a process for performing processing similar to that of the collection unit 21, the preprocessing unit 22, the learning unit 23, the relearning processing unit 24, or the like.

As described above, the computer 100 reads and executes a program, thereby operating as an information processing device that executes a control method. Furthermore, the computer 100 may also implement functions similar to those of the embodiment described above by reading the program described above from a recording medium using a medium reading device and executing the read program described above. Note that a program mentioned in another embodiment is not limited to being executed by the computer 100. For example, the embodiments may be similarly applied to a case where another computer or server executes the program, or a case where these cooperatively execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method for causing a computer to perform a process comprising:

obtaining a trained model for each area of a plurality of areas;

detecting a first radiation temperature for each of the areas;

blowing blowout air to an area where temperature unevenness is predicted among the plurality of areas on a basis of a room temperature, an outside temperature, the detected first radiation temperature for each of the areas, and the trained model;

detecting a second radiation temperature for the area after the blowout air is blown; and executing re-training of the trained model on a basis of a label related to temperature unevenness created on a basis of the detected second radiation temperature.

2. The control method according to claim 1, wherein
the detecting detects the second radiation temperature for each of the areas after the blowout air is blown, and
the label is based on a relative relationship of the detected second radiation temperature for each of the areas.

3. The control method according to claim 1, the method causing the computer to perform the process further comprising:

counting a number of times of temperature unevenness that is able to be eliminated on a basis of a relative relationship of the detected second radiation temperature for each of the areas and a set condition of an air machine, wherein
the label is based on the relative relationship of the detected second radiation temperature for each of the areas in a case where the counted number of times is equal to or more than a preset threshold value.

4. The control method according to claim 1, the method causing the computer to perform the process further comprising:

calculating an occurrence probability of the temperature unevenness for each of the areas on a basis of the first radiation temperature and the trained model for each area of the plurality of areas;

detecting the second radiation temperature for each of the areas after rotating a direction of an air deflector in such a manner that the blowout air is blown to an area where, of the occurrence probability of the temperature unevenness for each of the areas, the occurrence probability of the temperature unevenness is maximum;

determining whether or not the temperature unevenness has occurred in each of the areas in a certain period of time on a basis of a relative relationship of the detected second radiation temperature for each of the areas; and counting a number of times of the temperature unevenness in each of the areas in response to the temperature unevenness being determined to have occurred, wherein the executing executes the re-training of the trained model for an area where the number of times of the temperature unevenness in each of the areas is equal to or more than a preset threshold value in association with the label, which is based on a relative relationship of the detected second radiation temperature for each of the areas.

5. The control method according to claim 1, the method causing the computer to perform the process further comprising:

storing, in a storage unit, an area where, of a calculated occurrence probability of temperature unevenness for each of the areas, the occurrence probability of the temperature unevenness is maximum as an area to be affected by an external environment;

detecting the second radiation temperature for each of the areas after rotating a direction of an air deflector in such a manner that the blowout air is blown to the area to be affected by the external environment stored in the storage unit;

determining whether or not the temperature unevenness has occurred in each of the areas in a certain period of time on a basis of a relative relationship of the detected second radiation temperature for each of the areas; and identifying an area where a number of times of the temperature unevenness in each of the areas is equal to or more than a preset threshold value as the area to be affected by the external environment in response to the temperature unevenness being determined to have occurred, wherein the executing executes the re-training of the trained model for the identified area to be affected by the external environment in association with the label, which is based on the relative relationship of the detected second radiation temperature.

6. The control method according to claim 1, the method causing the computer to perform the process further comprising:

determining whether or not each temperature unevenness in each of the areas is temperature unevenness in response to a preset time having e lapsed as an operating time of an air machine, wherein in response to the temperature unevenness being determined to be temperature unevenness when the preset time has elapsed and when a number of times of the temperature unevenness is equal to or more than a preset threshold value, the executing executes the re-training of the trained model for an area where the number of times of the temperature unevenness in each of the areas is equal to or more than the preset threshold value in association with the label, which is based on a relative relationship of the detected second radiation temperature.

7. The control method according to claim 1, wherein the executing executes the re-training of the trained model using the second radiation temperature, the room temperature, the outside temperature, and meteorological data as an explanatory variable and using temperature unevenness created on a basis of a relative relationship of the detected second radiation temperature as an objective variable.

8. The control method according to claim 1, the method causing the computer to perform the process further comprising:

associating a label that indicates that temperature unevenness has occurred with an area to be affected by an external environment;

generating a trained model related to the area to be affected by the external environment on a basis of the label that indicates that the temperature unevenness has occurred and the detected second radiation temperature; and updating an existing generated trained model related to the area to be affected by the external environment with the generated trained model.

9. The control method according to claim 1, the method causing the computer to perform the process further comprising:

executing training using class classification related to logistic regression or a neural network on a basis of temperature unevenness created on a basis of a relative relationship of the detected second radiation temperature; and generating the trained model on a basis of the executed training.

10. The control method according to claim 5, wherein the area to be affected by the external environment includes an area with a window among a plurality of areas that divides an indoor space.

11. A non-transitory computer-readable recording medium storing a control program causing a computer to perform a process comprising:
- obtaining a trained model for each area of a plurality of areas;
- detecting a first radiation temperature for each of the areas;
- blowing blowout air to an area where temperature unevenness is predicted among the plurality of areas on a basis of the detected first radiation temperature for each of the areas and the trained model;
- detecting a second radiation temperature for the area after the blowout air is blown; and
- executing re-training of the trained model on a basis of a label related to temperature unevenness created on a basis of the detected second radiation temperature.

12. An information processing device comprising:
- a memory; and
- a processor coupled to the memory and configured to:
- obtain a trained model for each area of a plurality of areas;
- detect a first radiation temperature for each of the areas;
- blow blowout air to an area where temperature unevenness is predicted among the plurality of areas on a basis of a room temperature, an outside temperature, the detected first radiation temperature for each of the areas, and the trained model;
- detect a second radiation temperature for the area after the blowout air is blown; and
- execute re-training of the trained model on a basis of a label related to temperature unevenness created on a basis of the detected second radiation temperature.

* * * * *